(12) United States Patent
Kitamura et al.

(10) Patent No.: US 7,998,896 B2
(45) Date of Patent: *Aug. 16, 2011

(54) EXHAUST GAS PURIFYING CATALYST

(75) Inventors: Ichiro Kitamura, Shizuoka (JP); Kenichi Taki, Shizuoka (JP); Akimasa Hirai, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 763 days.

This patent is subject to a terminal disclaimer.

(21) Appl. No.: 11/997,430

(22) PCT Filed: Jul. 24, 2006

(86) PCT No.: PCT/JP2006/314593
§ 371 (c)(1), (2), (4) Date: Jan. 31, 2008

(87) PCT Pub. No.: WO2007/015387
PCT Pub. Date: Feb. 8, 2007

(65) Prior Publication Data
US 2010/0150792 A1 Jun. 17, 2010

(30) Foreign Application Priority Data
Aug. 1, 2005 (JP) ................................. 2005-223049

(51) Int. Cl.
B01J 23/00 (2006.01)
B01J 21/00 (2006.01)
B01J 20/00 (2006.01)
B01D 50/00 (2006.01)
B01D 53/34 (2006.01)

(52) U.S. Cl. ........ 502/326; 502/304; 502/327; 502/332; 502/333; 502/334; 502/339; 502/349; 502/355; 502/439; 502/527.12; 502/527.13; 422/180

(58) Field of Classification Search .................. 502/304, 502/326, 327, 332, 333, 334, 339, 349, 355, 502/439, 527.12, 527.13
See application file for complete search history.

(56) References Cited

U.S. PATENT DOCUMENTS

| 4,118,199 | A | | 10/1978 | Volker et al. | |
|---|---|---|---|---|---|
| 4,680,282 | A | * | 7/1987 | Blanchard et al. | ............ 502/304 |
| 4,931,419 | A | | 6/1990 | Blanchard et al. | |
| 5,057,483 | A | * | 10/1991 | Wan | ............................... 502/304 |

(Continued)

FOREIGN PATENT DOCUMENTS
DE 2530822 7/1975
(Continued)

*Primary Examiner* — Cam N. Nguyen
(74) *Attorney, Agent, or Firm* — Davis & Bujold, P.L.L.C.

(57) ABSTRACT

An exhaust gas purifying catalyst having a good ignition performance is provided. The exhaust gas purifying catalyst 1 includes a catalyst substrate 3 and a catalyst coating layer 5 which contains a noble metal and a refractory inorganic oxide and is formed on the catalyst substrate. The exhaust gas purifying catalyst is characterized in that the catalyst coating layer 5 includes an upstream portion 11 located upstream and a downstream portion 13 located downstream in a flow direction of an exhaust gas. The upstream portion 11 has a layered structure including an upstream portion inside layer 17 and an upstream portion outside layer 15. The upstream portion inside layer contains a cerium-zirconium composite oxide in which a relative proportion of $CeO_2$ is 50 to 95 wt %, as the refractory inorganic oxide, and the upstream portion outside layer 15 and the downstream portion 13 contain a cerium-zirconium composite oxide in which a relative proportion of $ZrO_2$ is 50 to 95 wt %, as the refractory inorganic oxide.

7 Claims, 6 Drawing Sheets

U.S. PATENT DOCUMENTS

| | | | |
|---|---|---|---|
| 5,128,306 A * | 7/1992 | Dettling et al. | 502/304 |
| 5,139,992 A * | 8/1992 | Tauster et al. | 502/304 |
| 5,147,842 A * | 9/1992 | Funabiki et al. | 502/304 |
| 5,376,610 A * | 12/1994 | Takahata et al. | 502/66 |
| 5,597,771 A * | 1/1997 | Hu et al. | 502/304 |
| 6,080,375 A * | 6/2000 | Mussmann et al. | 423/213.5 |
| 6,087,298 A * | 7/2000 | Sung et al. | 502/333 |
| 6,335,305 B1 * | 1/2002 | Suzuki et al. | 502/325 |
| 6,413,904 B1 * | 7/2002 | Strehlau et al. | 502/328 |
| 6,492,297 B1 * | 12/2002 | Sung | 502/304 |
| 6,846,466 B2 * | 1/2005 | Matsumoto et al. | 422/180 |
| 7,022,646 B2 * | 4/2006 | Li | 502/339 |
| 7,189,376 B2 * | 3/2007 | Kumar et al. | 422/177 |
| 7,524,465 B2 * | 4/2009 | Kumar et al. | 422/180 |
| 7,560,079 B2 * | 7/2009 | Okawara | 422/180 |
| 7,678,347 B2 * | 3/2010 | Chen | 422/180 |
| 2002/0131914 A1 * | 9/2002 | Sung | 422/177 |
| 2003/0039597 A1 * | 2/2003 | Deeba et al. | 422/177 |
| 2003/0083194 A1 * | 5/2003 | Sung | 502/304 |
| 2004/0001781 A1 * | 1/2004 | Kumar et al. | 422/180 |
| 2004/0043897 A1 * | 3/2004 | Tadao | 502/302 |
| 2005/0031501 A1 * | 2/2005 | Kawai et al. | 422/180 |
| 2006/0057046 A1 * | 3/2006 | Punke et al. | 423/215.5 |
| 2007/0014705 A1 * | 1/2007 | Chen | 422/168 |
| 2009/0130010 A1 * | 5/2009 | Jantsch et al. | 423/239.1 |

FOREIGN PATENT DOCUMENTS

| | | |
|---|---|---|
| EP | 0313434 | 4/1989 |
| EP | 1 911 517 A1 | 4/2008 |
| JP | 9-131530 | 5/1997 |
| JP | 9131530 | 5/1997 |
| JP | 10-296085 | 11/1998 |
| JP | 2000-301000 | 10/2000 |
| JP | 2001-70792 | 3/2001 |
| JP | 2001-162166 | 6/2001 |
| JP | 2003-326170 | 11/2003 |
| JP | 2004-283692 | 10/2004 |
| JP | 2004-298813 | 10/2004 |
| WO | 03033119 | 4/2003 |

* cited by examiner

EXHAUST GAS PURIFYING CATALYST

TECHNICAL FIELD

The present invention relates to an exhaust gas purifying catalyst that removes toxic substances contained in exhaust gas from an internal combustion engine of an automobile, a motorcycle, and others.

BACKGROUND ART

An exhaust gas purifying catalyst is formed by coating a substrate made of ceramics or the like with a catalyst coating layer containing a refractory inorganic oxide and a noble metal. These days, most of catalysts are three-way catalysts that purify HC, CO and NOx at the same time.

One of properties required for an exhaust gas purifying catalyst is a property to be activated rapidly after engine start even in a low temperature range (i.e., ignition performance: low-temperature activation property). Researches have been performed to improve ignition performance of exhaust gas purifying catalysts, for example, by providing a catalyst layer with a two-layer structure (see Patent Documents 1 to 4).

For example, claim 1 of Publication of Japanese Patent No. 3235640 (Patent Document 1) recites that an inside layer of a catalyst layer contains a cerium-zirconium composite oxide with a weight ratio of 100/2 to 100/80 in terms of cerium/zirconium oxide, and an outside layer of the catalyst layer contains a cerium-zirconium composite oxide with a weight ratio of 2/100 to 100/100 in terms of cerium/zirconium oxide.

Claim 1 of Publication of Japanese Unexamined Patent Application No. 2004-298813 (Patent Document 2) recites that an inside layer of a catalyst layer is a composite ceramic containing platinum-supported alumina constituted by porous alumina supported with platinum component and an oxygen storing ceria-zirconia composite oxide, and an outside layer of the catalyst layer is a composite ceramic containing: at least one of rhodium supported ceria-zirconia composite oxide and rhodium supported alumina, each constituted by a low thermally degradable ceria-zirconia composite oxide or a porous alumina supported with rhodium component; and at least one of a porous alumina and a low thermally degradable ceria-zirconia composite oxide.

Claim 5 of Publication of Japanese Unexamined Patent Application No. 2001-70792 (Patent Document 3) recites that an inside layer of a catalyst layer contains palladium, and an outside layer contains both of a zirconium-based composite oxide coexistently supported with rhodium and platinum, and a cerium-based composite oxide coexistently supported with rhodium and platinum.

Claims 1 and 2 of Publication of Japanese Unexamined Patent Application No. 10-296085 (Patent Document 4) recites that an inside layer of a catalyst layer is constituted by a refractory inorganic oxide including active alumina as a main component, Ce, Zr, Pd, and Ba, and has a Ce/Zr mol ratio of 85/15 to 30/70. An outside layer of the catalyst layer is constituted by a refractory inorganic oxide including active alumina as a main component, at least one selected from Ce, Zr and their compounds, and Rh, and has a Ce/Zr mol ratio of 0/100 to 25/75.

Patent Document 1: Publication of Japanese Patent No. 3235640
Patent Document 2: Publication of Japanese Unexamined Patent Application No. 2004-298813
Patent Document 3: Publication of Japanese Unexamined Patent Application No. 2001-70792
Patent Document 4: Publication of Japanese Unexamined Patent Application No. 10-296085

DISCLOSURE OF THE INVENTION

Problems to be Solved by the Invention

However, further improvement in ignition performance is required these days due to worldwide tightening of regulations on automobile exhaust gas emission.

The present invention, which has been made in view of the above circumstances, has an object to provide an exhaust gas purifying catalyst which has an improved ignition performance.

Means to Solve the Problems (1) The invention according to claim 1 provides an exhaust gas purifying catalyst which includes a catalyst substrate; and a catalyst coating layer containing a noble metal and a refractory inorganic oxide, and formed on the catalyst substrate. The catalyst coating layer includes an upstream portion located upstream and a downstream portion located downstream in a flow direction of an exhaust gas. The upstream portion has a layered structure including an upstream portion inside layer and an upstream portion outside layer. The upstream portion inside layer contains a cerium-zirconium composite oxide in which a relative proportion of $CeO_2$ is 50 to 95 wt %, as the refractory inorganic oxide, and the upstream portion outside layer and the downstream portion contain a cerium-zirconium composite oxide in which a relative proportion of $ZrO_2$ is 50 to 95 wt %, as the refractory inorganic oxide.

According to the exhaust gas purifying catalyst of the present invention, the cerium-zirconium composite oxide in which a relative proportion of $CeO_2$ is 50 to 95 wt % (hereinafter referred to as the "Ce rich composite oxide") in the upstream inside layer of the upstream portion in the catalyst coating layer adsorbs exhaust gas components in an exhaust gas. The noble metal contained in the catalyst coating layer degrades the adsorbed exhaust gas components.

Due to the above described action, the exhaust gas purifying catalyst of the present invention may achieve a high exhaust gas purifying performance, and particularly may achieve a high ignition performance. Specifically, since the Ce rich composite oxide is contained in the upstream portion inside layer in the present invention, a higher exhaust gas purifying performance and a higher ignition performance may be achieved.

Also, the exhaust gas purifying catalyst of the present invention may achieve a high exhaust gas purifying performance since the upstream portion outside layer and the downstream portion in the catalyst coating layer contain the cerium-zirconium composite oxide in which a relative proportion of $ZrO_2$ is 50 to 95 wt % (hereinafter referred to as the "Zr rich composite oxide").

In the present invention, the upstream portion inside layer contains the cerium-zirconium composite oxide which is, as a whole, in a Ce rich state, and preferably contains only Ce rich composite oxide (without containing Zr rich composite oxide).

Also, the upstream portion outside layer and the downstream portion contain the cerium-zirconium composite oxide contained which is, as a whole, in a Zr rich state, and preferably contain only Zr rich composite oxide (without containing Ce rich composite oxide).

There is no particular limitation to the catalyst substrate as long as the catalyst substrate is usually used for an exhaust gas purifying catalyst. For example, a honeycomb substrate, a corrugated substrate, and a monolith honeycomb substrate may be employed. The catalyst substrate may be made of any refractory material. For example, an integrally structured substrate made of refractory ceramic, such as cordierite, or of metal, such as ferrite stainless steel, may be employed.

The noble metal may be, for example, Rh, Pd or Pt. The noble metal contained in the upstream portion outside layer may be Rh only or may be a combination of Rh and another metal. The noble metal contained in the upstream portion inside layer is preferably one or a combination of two or more selected from Rh, Pd and Pt. The noble metal contained in the downstream portion is preferably one or a combination of two or more selected from Rh, Pd and Pt.

The refractory inorganic oxide may be, for example, alumina (particularly active alumina), Zr oxide, Ce oxide, ZrCe composite oxide, silica and titania. A preferable amount of the refractory inorganic oxide is within a range of 100-300 g per liter of the catalyst.

The catalyst coating layer may contain Ba, La, Nd, Pr or Y. It is particularly preferable to contain Ba and/or La. A preferable amount of Ba and/or La is 0 to 30 g per liter of the catalyst.

An area ratio, or a length ratio in the flow direction of the exhaust gas, between the upstream portion and the downstream portion is preferably within a range of 1:0.2 to 5.

The exhaust gas purifying catalyst in the present invention may be formed, for example, with a single catalyst substrate and a catalyst coating layer formed on the catalyst substrate. In this case, each of an upstream portion and a downstream portion may be formed on the single catalyst substrate. The upstream portion, which may be located upstream from the downstream portion, is preferably an area including an end surface of the exhaust gas purifying catalyst as an entrance of an exhaust gas. The downstream portion, which may be located downstream from the upstream portion, is preferably an area including an end surface of the exhaust gas purifying catalyst as an exit of an exhaust gas.

The exhaust gas purifying catalyst in the present invention may include a combination of two or more catalyst substrates. In this case, an upstream portion may be provided on a surface of a certain catalyst substrate and a downstream portion may be provided on a surface of the remaining catalyst substrate. The catalyst substrate on which the upstream portion is provided may be disposed on an upstream side, while the catalyst substrate on which the downstream portion is provided may be disposed on a downstream side in the flow direction of the exhaust gas.

The catalyst coating layer in the present invention may be constituted by only two portions of an upstream portion and a downstream portion, or may include another area, for example, upstream from the upstream portion, between the upstream portion and the downstream portion, or downstream from the downstream portion.

The upstream portion of the catalyst coating layer may be constituted by two layers of an upstream portion inside layer and an upstream portion outside layer, or may further include another layer. The another layer may be provided inside of the upstream portion inside layer, between the upstream portion inside layer and the upstream portion outside layer, or outside of the upstream portion outside layer.

(2) The invention according to claim 2 provides the exhaust gas purifying catalyst as set forth in claim 1 wherein the downstream portion has a layered structure including a downstream portion inside layer and a downstream portion outside layer, and wherein the downstream portion inside layer and the downstream portion outside layer are different in the following (A) and/or (B): (A) a type and/or a concentration of the noble metal; and (B) a type of the refractory inorganic oxide.

In the exhaust gas purifying catalyst of the present invention, (A) or (B), or both of (A) and (B) may be different. This allows various designs of properties of the exhaust gas purifying catalyst depending on purposes.

The downstream portion of the catalyst coating layer may be constituted by two layers of a downstream portion inside layer and a downstream portion outside layer, or may further include another layer. The another layer may be provided inside of the downstream portion inside layer, between the downstream portion inside layer and the downstream portion outside layer, or outside of the downstream portion outside layer.

(3) The invention according to claim 3 provides the exhaust gas purifying catalyst as set forth in claim 2 wherein the downstream portion outside layer contains Rh as the noble metal.

The exhaust gas purifying catalyst of the present invention has a further high exhaust gas purifying performance since the downstream portion outside layer contains Rh.

(4) The invention according to claim 4 provides the exhaust gas purifying catalyst as set forth in one of claims 1 to 3 wherein the upstream portion outside layer contains Rh as the noble metal.

The exhaust gas purifying catalyst of the present invention has a further high exhaust gas purifying performance since the upstream portion outside layer contains Rh.

(5) The invention according to claim 5 provides the exhaust gas purifying catalyst as set forth in one of claims 1 to 4 wherein the upstream portion inside layer contains Pd as the noble metal.

The exhaust gas purifying catalyst of the present invention has a further high exhaust gas purifying performance since the downstream portion inside layer contains Pd.

(6) The invention according to claim 6 provides the exhaust gas purifying catalyst as set forth in one of claims 1 to 5 wherein a coating amount per unit volume of the catalyst coating layer is smaller in the upstream portion than in the downstream portion.

In the exhaust gas purifying catalyst of the present invention, since the upstream portion has a smaller coating amount per unit volume of the catalyst coating layer, the upstream portion has a low heat capacity and is heated up to thereby achieve an improved catalytic activity in a short time after engine start. Accordingly, the exhaust gas purifying catalyst of the present invention has a further high ignition performance.

The ratio in the coating amount per unit volume of the catalyst coating layer between the upstream portion and the downstream portion is preferably within a range of 1:1 to 5, and more preferably within a range of 1:1.1 to 2.0.

(7) The invention according to claim 7 provides the exhaust gas purifying catalyst as set forth in one of claims 1 to 6 wherein the noble metal is contained mainly in an external region of the upstream portion outside layer.

The exhaust gas purifying catalyst of the present invention has a further high exhaust gas purifying performance (particularly ignition performance) since the noble metal (for example, Rh) is contained mainly in the external region of the upstream portion outside layer.

Being contained mainly in the external region means, for example, that when the thickness of the upstream portion outside layer is indicated by "T", 80 wt % or more of the noble metal contained in the upstream portion outside layer is located in a region from the surface to a depth αT (α is 0.1 to 0.2) of the upstream portion outside layer.

Figure 1:
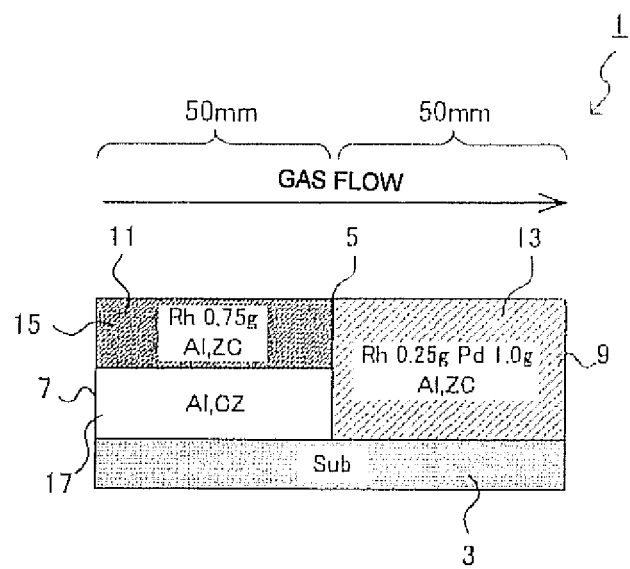
FIG. 1 is an explanatory diagram showing a structure of an exhaust gas purifying catalyst according to a first embodiment of the present invention.

| EXPLANATION OF REFERENCE NUMERALS | |
|---|---|
| 1 | exhaust gas purifying catalyst |
| 3 | substrate |
| 5 | catalyst coating layer |
| 7 | entrance end |
| 9 | exit end |

| EXPLANATION OF REFERENCE NUMERALS | |
|---|---|
| 11 | upstream portion |
| 13 | downstream portion |
| 13a | downstream portion inside layer |
| 13b | downstream portion outside layer |
| 15 | upstream portion outside layer |
| 17 | upstream portion inside layer |

BEST MODE FOR CARRYING OUT THE INVENTION

The present invention will be specifically explained hereinafter by way of embodiments.

Embodiment 1 a) A description will now be given on a structure of an exhaust gas purifying catalyst 1 of an Embodiment 1 with reference to FIG. 1. In FIG. 1 and later-described FIGS. 2 through 17, "CZ" represents a Ce rich composite oxide, "ZC" represents a Zr rich composite oxide, "Al" represents alumina, and "Sub" represents a substrate.

The exhaust gas purifying catalyst 1 is constituted by a substrate (a catalyst substrate) 3 and a catalyst layer 5 formed on a surface of the substrate 3. The substrate 3 is a monolith honeycomb substrate having a length of 100 mm, a capacity of 1.0 L and a cell density of 900 cells/in$^2$. The catalyst coating layer 5 is formed on an inner face of each cell of the substrate 3. In FIG. 1, a left end is an entrance end 7 of the cell and a right end is an exit end 9 of the cell. Accordingly, a direction from the entrance end 7 to the exit end 9 is a flow direction of exhaust gas. (Although a gas flow is indicated by an arrow only in FIG. 1, the same is applicable to the other figures.)

The catalyst coating layer 5 includes an upstream portion 11 over an area of 50 mm from the entrance end 7 and a downstream portion 13 over an area of 50 mm from the exit end 9 (that is, a portion from a most downstream end of the upstream portion 11 to the exit end 9). Also, the upstream portion 11 includes an upstream portion outside layer 15 and an upstream portion inside layer 17.

The upstream portion outside layer 15 includes Rh (0.75 g) as a noble metal, alumina and a Zr rich composite oxide. The upstream portion inside layer 17 includes alumina and a Ce rich composite oxide (a refractory inorganic oxide). The downstream portion 13 includes Rh (0.25 g) and Pd (1.0 g) as noble metals, alumina and a Zr rich composite oxide (a refractory inorganic oxide).

b) A description will now be given on a method of manufacturing the exhaust gas purifying catalyst 1 of the Embodiment 1.

Slurries S1A, S1B and S1C were prepared as below.

(Slurry S1A)

Below listed components (fine powder; the same applies below) were mixed to prepare the slurry S1A.

alumina: 25 g

Ce rich composite oxide (with a relative proportion of $CeO_2$ of 80 wt %): 25 g water: 50 g (Slurry S1B)
Below listed components were mixed to prepare the slurry S1B.
  alumina: 25 g
  Zr rich composite oxide (with a relative proportion of $ZrO_2$ of 80 wt %): 25 g
  Rh nitrate solution: an amount containing 0.75 g of Rh
  water: 50 g
(Slurry S1C)
Below listed components were mixed to prepare the slurry S1C.
  alumina: 50 g
  Zr rich composite oxide (with a relative proportion of $ZrO_2$ of 80 wt %): 50 g
  Rh nitrate solution: an amount containing 0.25 g of Rh
  Pd nitrate solution: an amount containing 1.0 g of Pd
  water: 100 g 50 g of the slurry S1A was applied to coat a cell of the substrate 3 over an area of 50 mm from the entrance end 7, dried at 250° C. for an hour, and calcined at 500° C. for an hour. The upstream portion inside layer 17 was formed by this step.

The same conditions of drying and calcination are applicable hereinafter. In the present description, an amount of a coating of slurry means a weight of solid materials.

Subsequently, 50.75 g of the slurry S1B (containing 0.75 g of Rh) was applied to coat the area where the slurry S1A was already be applied, dried at 250° C. for an hour, and calcined at 500° C. for an hour. The upstream portion outside layer 15 was formed by this step.

Then, 101.25 g of the slurry S1C (containing 0.25 g of Rh and 1.0 g of Pd) was applied to coat the cell of the substrate 3 over an area of 50 mm from the exit end 9 (that is, a portion where the slurry S1A or S1B was not coated), dried at 250° C. for an hour, and was calcined at 500° C. for an hour. The downstream portion 13 was formed by this step, and thus the exhaust gas purifying catalyst 1 was completed.

Embodiment 2

Figure 2:
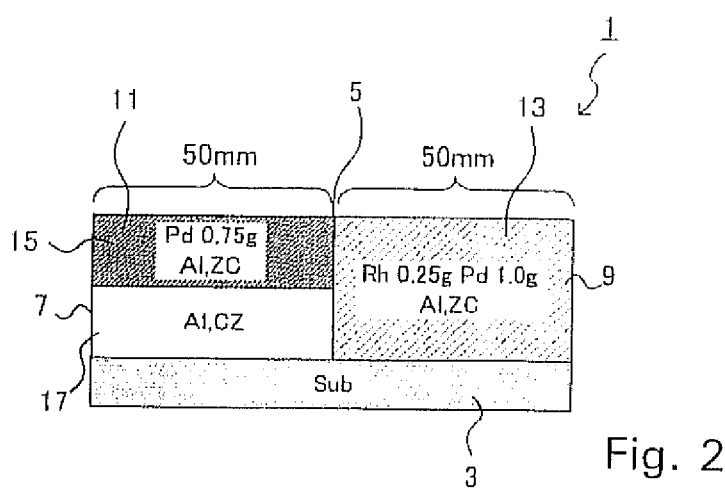
FIG. 2 is an explanatory diagram showing a structure of an exhaust gas purifying catalyst according to a second embodiment.

An exhaust gas purifying catalyst 1 of an Embodiment 2 has basically the same structure as that of the Embodiment 1, as shown in FIG. 2. The Embodiment 2 is different from the Embodiment 1 in that the noble metal contained in the downstream portion outside layer 15 is 0.75 g of Pd.

A method of manufacturing the exhaust gas purifying catalyst 1 of the Embodiment 2 is basically the same as in the Embodiment 1. In the Embodiment 2, a slurry S2 prepared by mixing below listed components was used in place of the slurry S1B.
(Slurry S2)
  alumina: 25 g
  Zr rich composite oxide (with a relative proportion of $ZrO_2$ of 80 wt %): 25 g
  Pd nitrate solution: an amount containing 0.75 g of Pd
  water: 100 g In the Embodiment 2, the slurry S1A was applied, dried and calcined to form the upstream portion inside layer 17. Then, 50.75 g of the slurry S2 (containing 0.75 g of Pd) was applied, in place of the slurry S1B, over an area where the slurry 1A has been applied, and dried and calcined to form the upstream portion outside layer 15. The method of forming the downstream portion 13 is the same as in the Embodiment 1.

Embodiment 3

Figure 3:
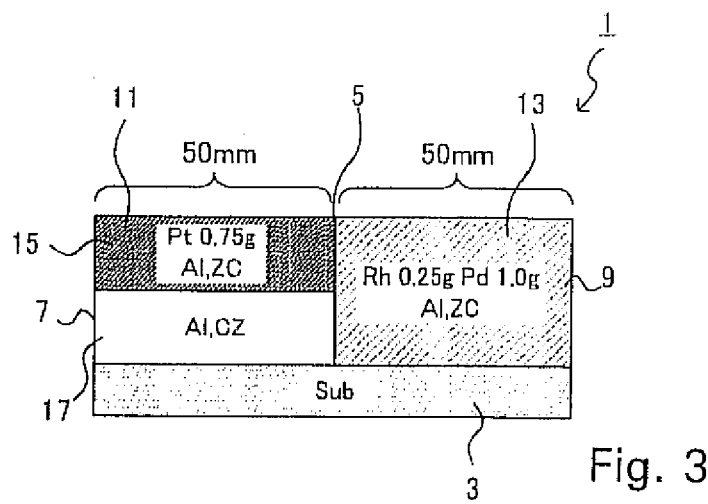
FIG. 3 is an explanatory diagram showing a structure of an exhaust gas purifying catalyst according to a third embodiment.

An exhaust gas purifying catalyst 1 of an Embodiment 3 has basically the same structure as that of the Embodiment 1, as shown in FIG. 3. The Embodiment 3 is different from the Embodiment 1 in that the noble metal contained in the upstream portion outside layer 15 is 0.75 g of Pt.

A method of manufacturing the exhaust gas purifying catalyst 1 of the Embodiment 3 is basically the same as in the Embodiment 1. In the Embodiment 3, a slurry S3 prepared by mixing below listed components was used in place of the slurry S1B.
(Slurry S3)
  alumina: 25 g
  Zr rich composite oxide (with a relative proportion of $ZrO_2$ of 80 wt %): 25 g
  Pt nitrate solution: an amount containing 0.75 g of Pt
  water: 100 g In the Embodiment 3, the slurry S1A was applied, dried and calcined to form the upstream portion inside layer 17. Then, 50.75 g of the slurry S3 (containing 0.75 g of Pt) was applied, in place of the slurry S1B, over an area where the slurry 1A has been applied, and dried and calcined to form the upstream portion outside layer 15. The method of forming the downstream portion 13 is the same as in the Embodiment 1.

Embodiment 4

Figure 4:
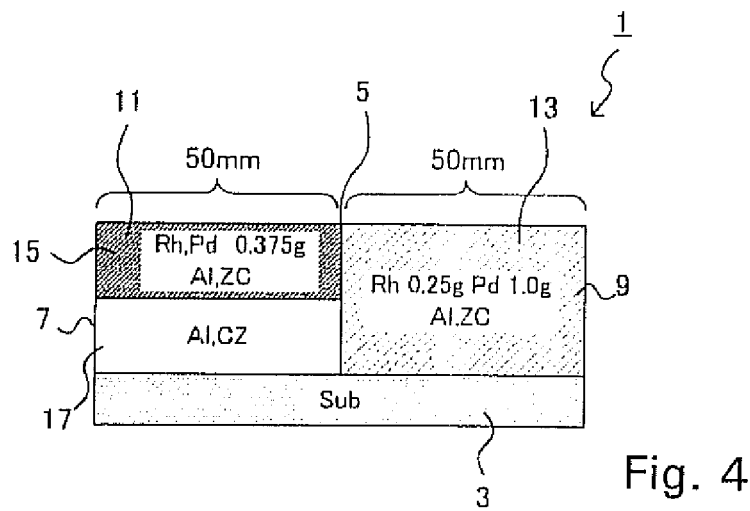
FIG. 4 is an explanatory diagram showing a structure of an exhaust gas purifying catalyst according to a fourth embodiment.

An exhaust gas purifying catalyst 1 of an Embodiment 4 has basically the same structure as that of the Embodiment 1, as shown in FIG. 4. The Embodiment 4 is different from the Embodiment 1 in that the noble metals contained in the upstream portion outside layer are 15 0.375 g of Rh and 0.375 g of Pd.

A method of manufacturing the exhaust gas purifying catalyst 1 of the Embodiment 4 is basically the same as in the Embodiment 1. In the Embodiment 4, a slurry S4 prepared by mixing below listed components was used in place of the slurry S1B.
(Slurry S4)
  alumina: 25 g
  Zr rich composite oxide (with a relative proportion of $ZrO_2$ of 80 wt %): 25 g
  Rh nitrate solution: an amount containing 0.375 g of Rh
  Pd nitrate solution: an amount containing 0.375 g of Pd
  water: 50 g In the Embodiment 4, the slurry S1A was applied, dried and calcined to form the upstream portion inside layer 17. Then, 50.75 g of the slurry S4 (containing 0.375 g of Rh and 0.375 g of Pd) was applied, in place of the slurry S1B, over an area where the slurry 1A has been applied, and dried and calcined to form the upstream portion outside layer 15. The method of forming the downstream portion 13 is the same as in the Embodiment 1.

Embodiment 5

Figure 5:
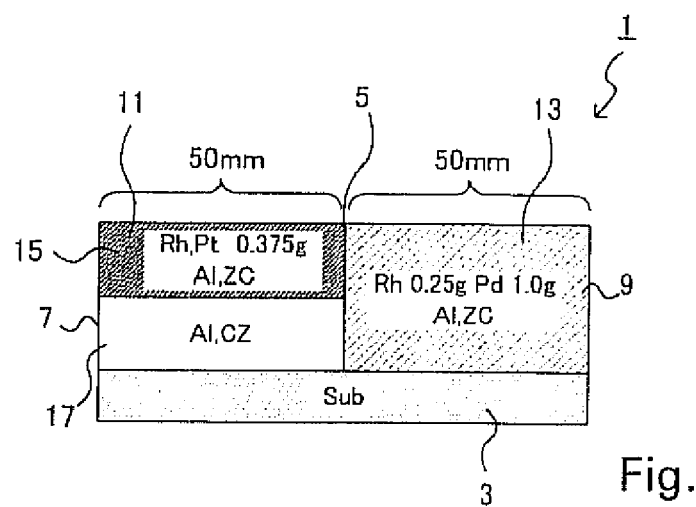
FIG. 5 is an explanatory diagram showing a structure of an exhaust gas purifying catalyst according to a fifth embodiment.

An exhaust gas purifying catalyst 1 of an Embodiment 5 has basically the same structure as that of the Embodiment 1, as shown in FIG. 5. The Embodiment 5 is different from the Embodiment 1 in that the noble metals contained in the upstream portion outside layer 15 are 0.375 g of Rh and 0.375 g of Pt.

Although a method of manufacturing the exhaust gas purifying catalyst 1 of the Embodiment 5 is basically the same as in the Embodiment 1, a slurry S5 prepared by mixing below listed components was used in place of the slurry S1B.

(Slurry S5)
  alumina: 25 g
  Zr rich composite oxide (with a relative proportion of $ZrO_2$ of 80 wt %): 25 g
  Rh nitrate solution: an amount containing 0.375 g of Rh
  Pt nitrate solution: an amount containing 0.375 g of Pt
  water: 50 g In the Embodiment 5, the slurry S1A was applied, dried and calcined to form the upstream portion inside layer 17. Then, 50.75 g of the slurry S5 (containing 0.375 g of Rh and 0.375 g of Pt) was applied, in place of the slurry SIB, over an area where the slurry 1A has been applied, and dried and calcined to form the upstream portion outside layer 15. The method of forming the downstream portion 13 is the same as in the Embodiment 1.

Embodiment 6

Figure 6:
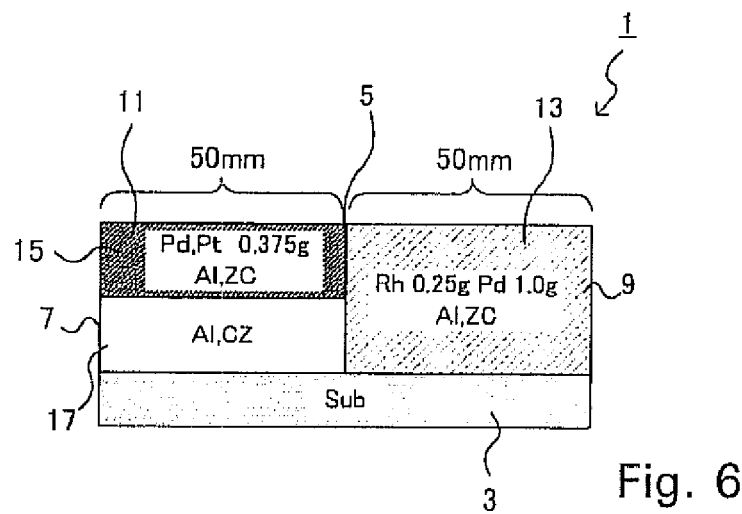
FIG. 6 is an explanatory diagram showing a structure of an exhaust gas purifying catalyst according to a sixth embodiment.

An exhaust gas purifying catalyst 1 of an Embodiment 6 has basically the same structure as that of the Embodiment 1, as shown in FIG. 6. The Embodiment 6 is different from the Embodiment 1 in that the noble metals contained in the upstream portion outside layer 15 are 0.375 g of Pd and 0.375 g of Pt.

A method of manufacturing the exhaust gas purifying catalyst 1 of the Embodiment 6 is basically the same as in the Embodiment 1. In the Embodiment 6, a slurry S6 prepared by mixing below listed components was used in place of the slurry S1B.
(Slurry S6)
  alumina: 25 g
  Zr rich composite oxide (with a relative proportion of $ZrO_2$ of 80 wt %): 25 g
  Pd nitrate solution: an amount containing 0.375 g of Pd
  Pt nitrate solution: an amount containing 0.375 g of Pt
  water: 50 g In the Embodiment 6, the slurry S1A was applied, dried and calcined to form the upstream portion inside layer 17. Then, 50.75 g of the slurry S6 (containing 0.375 g of Pd and 0.375 g of Pt) was applied over an area where the slurry 1A has been applied, and dried and calcined to form the upstream portion outside layer 15. The method of forming the downstream portion 13 is the same as in the Embodiment 1.

Embodiment 7

Figure 7:
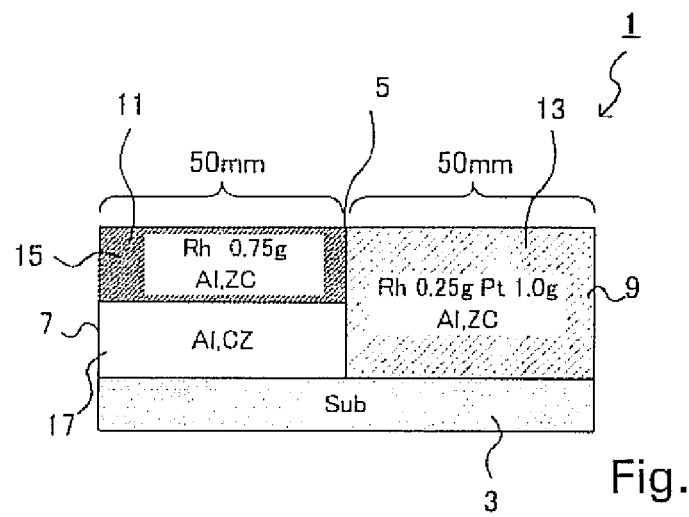
FIG. 7 is an explanatory diagram showing a structure of an exhaust gas purifying catalyst according to a seventh embodiment.

An exhaust gas purifying catalyst 1 of an Embodiment 7 has basically the same structure as that of the Embodiment 1, as shown in FIG. 7. The Embodiment 7 is different from the Embodiment 1 in that the noble metals contained in the downstream portion 13 are 0.25 g of Rh and 1.0 g of Pt.

A method of manufacturing the exhaust gas purifying catalyst 1 of the Embodiment 7 is basically the same as in the Embodiment 1. In the Embodiment 7, a slurry S7 prepared by mixing below listed components was used in place of the slurry S1C.
(Slurry S7)
  alumina: 50 g
  Zr rich composite oxide (with a relative proportion of $ZrO_2$ of 80 wt %): 50 g
  Rh nitrate solution: an amount containing 0.25 g of Rh
  Pt nitrate solution: an amount containing 1.0 g of Pt
  water: 100 g In the Embodiment 7, 101.25 g of the slurry S7 (containing 0.25 g of Rh and 1.0 g of Pt) was applied, in place of the slurry S1C, to coat the cell of the substrate 3 over an area of 50 mm from the exit end 9, dried and calcined to form the downstream portion 13. The method of forming the upstream portion 11 is the same as in the Embodiment 1.

Embodiment 8

Figure 8:
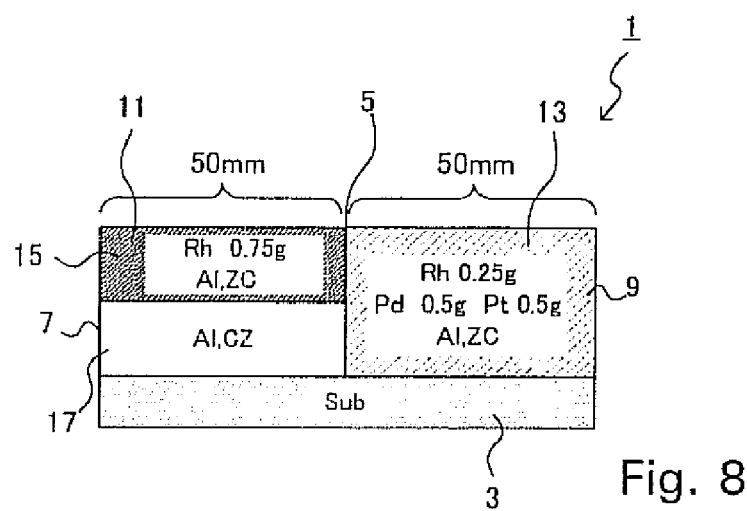
FIG. 8 is an explanatory diagram showing a structure of an exhaust gas purifying catalyst according to an eighth embodiment.

An exhaust gas purifying catalyst 1 of an Embodiment 8 has basically the same structure as that of the Embodiment 1, as shown in FIG. 8. The Embodiment 8 is different from the Embodiment 1 in that the noble metals contained in the downstream portion 13 are 0.25 g of Rh, 0.5 g of Pd and 0.5 g of Pt.

A method of manufacturing the exhaust gas purifying catalyst 1 of the Embodiment 8 is basically the same as in the Embodiment 1. In the Embodiment 8, a slurry S8 prepared by mixing below listed components was used in place of the slurry S1C.
(Slurry S8)
  alumina: 50 g
  Zr rich composite oxide (with a relative proportion of $ZrO_2$ of 80 wt %): 50 g
  Rh nitrate solution: an amount containing 0.25 g of Rh
  Pd nitrate solution: an amount containing 0.5 g of Pd
  Pt nitrate solution: an amount containing 0.5 g of Pt
  water: 100 g In the Embodiment 8, 101.25 g of the slurry S8 (containing 0.25 g of Rh, 0.5 g of Pd and 0.5 g of Pt) was applied, in place of the slurry S1C, to coat the cell of the substrate 3 over an area of 50 mm from the exit end 9, dried and calcined to form the downstream portion 13. The method of forming the upstream portion 11 is the same as in the Embodiment 1.

Figure 9:
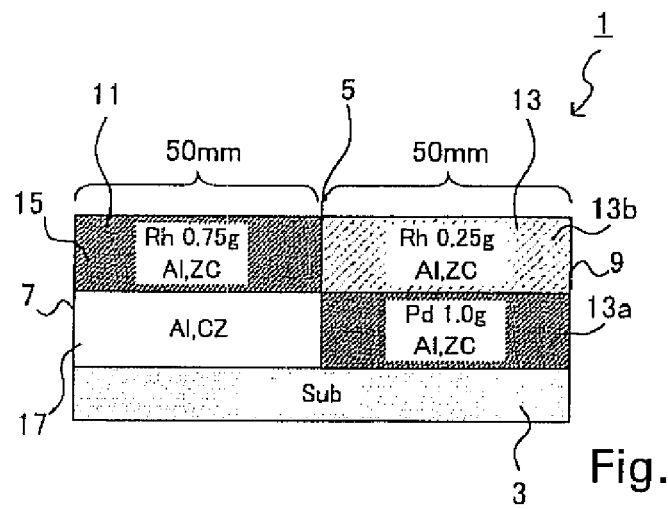
FIG. 9 is an explanatory diagram showing a structure of an exhaust gas purifying catalyst according to a ninth embodiment.

Embodiment 9 a) An exhaust gas purifying catalyst 1 of an Embodiment 9 has basically the same structure as that of the Embodiment 1, as shown in FIG. 9. The Embodiment 9 is different from the Embodiment 1 in that the downstream portion 13 is divided into the downstream portion inside layer 13a and the downstream portion outside layer 13b, and in that, as the noble metal, 0.25 g of Rh is contained in the downstream portion outside layer 13b and 1.0 g of Pd is contained in the downstream portion inside layer 13a.

b) Although a method of manufacturing the exhaust gas purifying catalyst 1 of the Embodiment 9 is basically the same as in the Embodiment 1, there are some differences in a method of forming the downstream portion 13. A description will be made below mainly with respect to the differences.

First, a slurry S9A and a slurry S9B to be used as slurries to form the downstream portion 13 were prepared by mixing below listed components, respectively.
(Slurry S9A)
  alumina: 25 g
  Zr rich composite oxide (with a relative proportion of $ZrO_2$ of 80 wt %): 25 g
  Pd nitrate solution: an amount containing 1.0 g of Pd
  water: 50 g
(Slurry S9B)
  alumina: 25 g
  Zr rich composite oxide (with a relative proportion of $ZrO_2$ of 80 wt %): 25 g
  Rh nitrate solution: an amount containing 0.25 g of Rh
  water: 50 g Then, the upstream portion inside layer 17 and the upstream portion outside layer 15 were formed using the slurry S1A and the slurry S1B in a same manner as in the Embodiment 1.

Subsequently, 51 g of the slurry S9A (containing 1.0 g of Pd) was applied to coat the cell of the substrate 3 over an area of 50 mm from the exit end 9 (that is, a portion not coated with the slurry S1A or S1B), dried at 250° C. for an hour and calcined at 500° C. for an hour. By this step, the downstream portion inside layer 13a was formed.

Further, 50.25 g of the slurry S9B (containing 0.25 g of Rh) was applied to coat the area previously coated with the slurry S9A, dried and calcined. Thus, the downstream portion outside layer 13b was formed, and the exhaust gas purifying catalyst 1 was completed.

Embodiment 10

Figure 10:
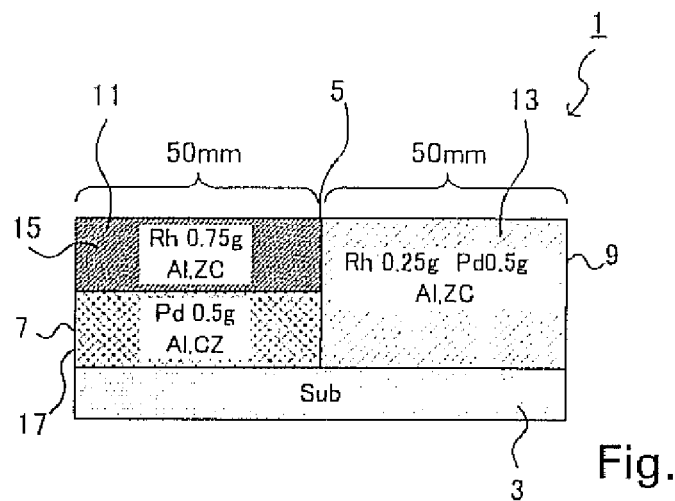
FIG. 10 is an explanatory diagram showing a structure of an exhaust gas purifying catalyst according to a tenth embodiment.

An exhaust gas purifying catalyst 1 of an Embodiment 10 has basically the same structure as that of the Embodiment 1, as shown in FIG. 10. The Embodiment 10 is different from the Embodiment 1 in that 0.5 g of Pd as the noble metal is contained in the upstream portion inside layer 17 and in that the noble metals contained in the downstream portion 13 are 0.25 g of Rh and 0.5 g of Pd.

A method of manufacturing the exhaust gas purifying catalyst 1 of the Embodiment 10 is basically the same as in the Embodiment 1. In the Embodiment 10, a slurry S10A prepared by mixing below listed components was used in place of the slurry S1A. Also, a slurry S10B prepared by mixing below listed components was used in place of the slurry S1C.
(Slurry S10A)
  alumina: 25 g
  Ce rich composite oxide (with a relative proportion of $CeO_2$ of 80 wt %): 25 g
  Pd nitrate solution: an amount containing 0.5 g of Pd
  water 50 g
(Slurry S10B)
  alumina: 50 g
  Zr rich composite oxide (with a relative proportion of $ZrO_2$ of 80 wt %): 50 g
  Rh nitrate solution: an amount containing 0.25 g of Rh
  Pd nitrate solution: an amount containing 0.5 g of Pd
  water: 100 g In the Embodiment 10, 50.5 g of the slurry S10A (containing 0.5 g of Pd) was applied, in place of the slurry S1A, to coat the cell of the substrate 3 over an area of 50 mm from the entrance end 7, dried and calcined to form the upstream portion inside layer 17. Then, the upstream portion outside layer 15 was formed on the upstream portion inside layer 17 in a same manner as in the Embodiment 1.

Subsequently, 100.75 g of the slurry S10B (containing 0.25 g of Rh and 0.5 g of Pd) was applied, in place of the slurry S1C, to coat an area of 50 mm from the exit end 9, dried and calcined. Thus, the downstream portion 13 was formed, and the exhaust gas purifying catalyst 1 was completed.

Embodiment 11

Figure 11:
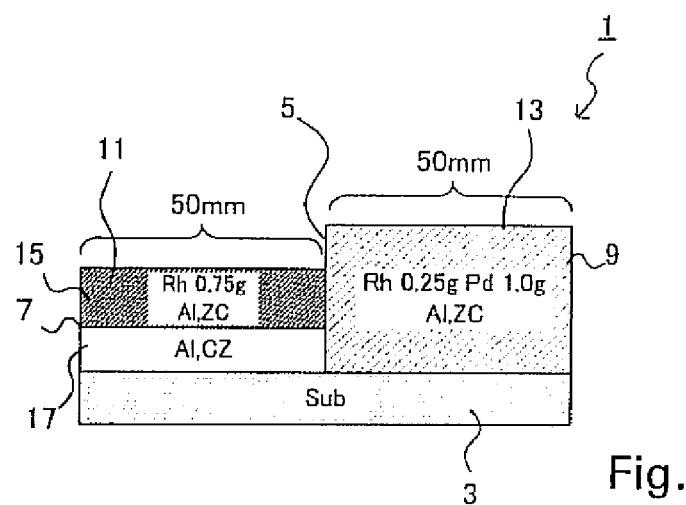
FIG. 11 is an explanatory diagram showing a structure of an exhaust gas purifying catalyst according to an eleventh embodiment.

An exhaust gas purifying catalyst 1 of an Embodiment 11 has basically the same structure as that of the Embodiment 1, as shown in FIG. 11. The Embodiment 11 is different from the Embodiment 1 in that a coating amount in the upstream portion 11 is 50.75 g which is smaller than a coating amount of 101.25 g in the downstream portion 13.

A method of manufacturing the exhaust gas purifying catalyst 1 of the Embodiment 11 is basically the same as in the Embodiment 1. In the Embodiment 11, a coating amount of the slurry S1A is 25 g for forming the upstream portion inside layer 17 and a slurry S11 prepared by mixing below listed components was used in place of the slurry S1B.

(Slurry S11)
  alumina: 12.5 g
  Zr rich composite oxide (with a relative proportion of $ZrO_2$ of 80 wt %): 12.5 g
  Rh nitrate solution: an amount containing 0.75 g of Rh
  water: 25 g In the Embodiment 11, 25 g of the slurry S1A was applied to coat the cell of the substrate 3 over an area of 50 mm from the entrance end 7, dried at 250° C. for an hour and calcined at 500° C. for an hour. Thus, the upstream portion inside layer 17 was formed.

Subsequently, 25.75 g of the slurry S11 (containing 0.75 g of Rh) was applied to coat the area previously coated with the slurry S1A, dried and calcined. Thus, the upstream portion outside layer 15 was formed. The method of forming the downstream portion 13 is the same as in the Embodiment 1.

Embodiment 12

Figure 12:
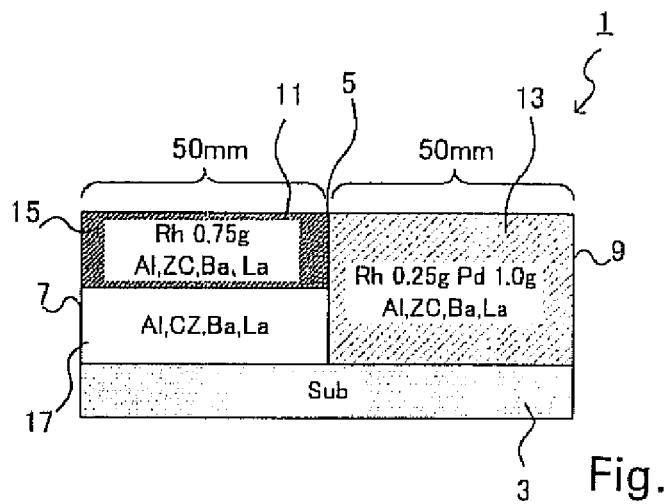
FIG. 12 is an explanatory diagram showing a structure of an exhaust gas purifying catalyst according to a twelfth embodiment.

An exhaust gas purifying catalyst 1 of an Embodiment 12 has basically the same structure as that of the Embodiment 1, as shown in FIG. 12. The Embodiment 12 is different from the Embodiment 1 in that each of the upstream portion inside layer 17, the upstream portion outside layer 15 and the downstream portion 13 contains barium and lanthanum.

A method of manufacturing the exhaust gas purifying catalyst 1 of the Embodiment 12 is basically the same as in the Embodiment 1. In the Embodiment 12, a slurry S12A prepared by mixing below listed components was used in place of the slurry S1A. A slurry S12B prepared by mixing below listed components was used in place of the slurry S1B. Also, a slurry S12C prepared by mixing below listed components was used in place of the slurry S1C.
(Slurry S12A)
  alumina: 25 g
  Ce rich composite oxide (with a relative proportion of $CeO_2$ of 80 wt %): 25 g
  barium sulphate: 5 g
  lanthanum carbonate: 2.5 g
  water: 57.5 g
(Slurry S12B)
  alumina: 25 g
  Zr rich composite oxide (with a relative proportion of $ZrO_2$ of 80 wt %): 25 g
  barium sulphate: 5 g:
  lanthanum carbonate: 2.5 g
  Rh nitrate solution: an amount containing 0.75 g of Rh
  water: 82.5 g
(Slurry S12C)
  alumina: 50 g
  Zr rich composite oxide (with a relative proportion of $ZrO_2$ of 80 wt %): 50 g
  barium sulphate: 10 g
  lanthanum carbonate: 5 g
  Rh nitrate solution: an amount containing 0.25 g of Rh
  Pd nitrate solution: an amount containing 1.0 g of Pd
  water: 115 g In the Embodiment 12, 57.5 g of the slurry S12A was applied, in place of the slurry S1A, to coat the cell of the substrate 3 over an area of 50 mm from the entrance end 7, dried and calcined to form the upstream portion inside layer 17.

Then, 58.25 g of the slurry S12B (containing 0.75 g of Rh) was applied to coat the area previously coated with the slurry S12A, dried and calcined to form the upstream portion outside layer 15.

Subsequently, 116.25 g of the slurry S12C (containing 0.25 g of Rh and 1.0 g of Pd) was applied to coat the cell of the substrate 3 over an area of 50 mm from the exit end 9, dried and calcined to form the downstream portion 13.

Embodiment 13

Figure 13:
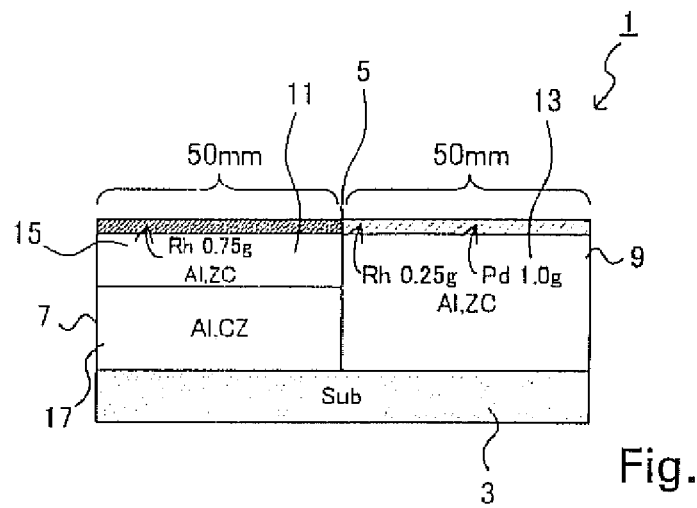
FIG. 13 is an explanatory diagram showing a structure of an exhaust gas purifying catalyst according to a thirteenth embodiment.

An exhaust gas purifying catalyst 1 of an Embodiment 13 has basically the same structure as that of the Embodiment 1, as shown in FIG. 13. However, Rh as the noble metal is contained mainly in a surface region (in an external region) of the upstream portion outside layer 15. Specifically, a thickness of the upstream portion outside layer 15 is 100 μm, and all the Rh is supported in a region from the surface of the upstream portion outside layer 15 to a depth of 10 μm.

The exhaust gas purifying catalyst 1 according to the Embodiment 13 was manufactured as below.

Firstly, 25 g of the slurry S1A was applied to coat the cell of the same substrate 3 as in the Embodiment 1 over an area of 50 mm from the entrance end 7, dried at 250° C. for an hour, and calcined at 500° C. for an hour, to form the upstream portion inside layer 17.

Then, 50 g of a below specified slurry S13 was applied to coat the area previously coated with the slurry S1A, dried at 250° C. for an hour, and calcined at 500° C. for an hour.
(Slurry S13)
alumina: 25 g
Zr rich composite oxide (with a relative proportion of $ZrO_2$ of 80 wt %): 25 g
water: 50 g Subsequently, 0.75 g of Rh was made to be supported in the area previously coated with the slurry S1A and the slurry S13 using an Rh nitrate solution, and dried at 250° C. for an hour.

Further, 100 g of the slurry S13 (with a total amount of 100 g of solid materials) was applied to coat the cell of the substrate 3 over an area of 50 mm from the exit end 9, dried at 250° C. for an hour and calcined at 500° C. for an hour. After the calcination, 0.25 g of Rh and 1.0 g of Pd were made to be supported in the area previously coated with the slurry S13 (over the area of 50 mm from the exit end 9) using an Rh nitrate solution and a Pt nitrate solution, and dried at 250° C. for an hour. Thus, the exhaust gas purifying catalyst 1 was completed.

Comparative Example 1

Figure 14:
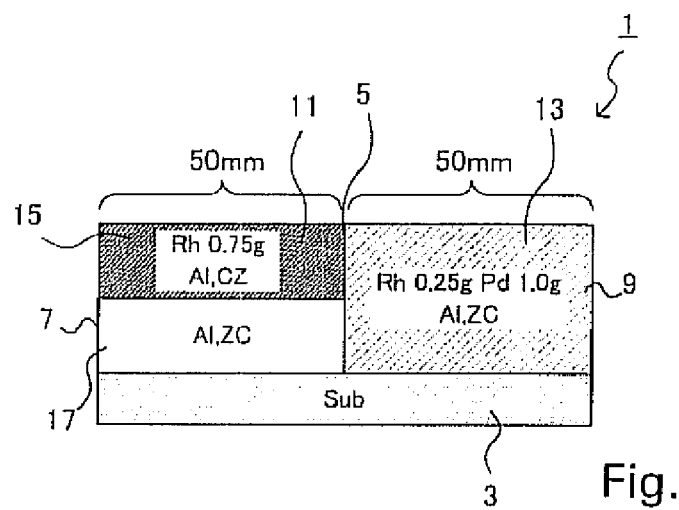
FIG. 14 is an explanatory diagram showing a structure of an exhaust gas purifying catalyst according to a comparative example 1.

A description will now be given on a structure of an exhaust gas purifying catalyst 1 of a Comparative Example 1 with reference to FIG. 14. The exhaust gas purifying catalyst 1 includes the catalyst coating layer 5 on a cell surface of the same substrate 3 as in the Embodiment 1. The catalyst coating layer 5 includes the upstream portion inside layer 17, the upstream portion outside layer 15 and the downstream portion 13 as in the Embodiment 1. The upstream portion inside layer 17 includes alumina and a Zr rich composite oxide. The upstream portion outside layer 15 includes Rh (0.75 g) as the noble metal, alumina and a Ce rich composite oxide. The downstream portion 13 includes Rh (0.25 g) and Pd (1.0 g) as the noble metal, alumina and a Zr rich composite oxide.

A description will now be given on a method of manufacturing the exhaust gas purifying catalyst 1 of the Comparative Example 1.

Firstly, 50 g of the slurry S13 was applied to coat the cell of the substrate 3 over an area of 50 mm from the entrance end 7, dried at 250° C. for an hour, and calcined at 500° C. for an hour, to form the upstream portion inside layer 17.

Then, 50.75 g of a below specified slurry SP1 (containing 0.75 g of Rh) was applied to coat the area previously coated with the slurry S13, dried at 250° C. for an hour, and calcined at 500° C. for an hour, to form the upstream portion outside layer 15.
(Slurry SP1)
alumina: 25 g
Ce rich composite oxide (with a relative proportion of $CeO_2$ of 80 wt %): 25 g
Rh nitrate solution: an amount containing 0.75 g of Rh
water: 50 g Subsequently, 101.25 g of the slurry S1C (containing 0.25 g of Rh and 1.0 g of Pd) was applied to coat the cell of the substrate 3 over an area of 50 mm from the exit end 9, dried at 250° C. for an hour and calcined at 500° C. for an hour, to form the downstream portion 13.

Comparative Example 2

Figure 15:
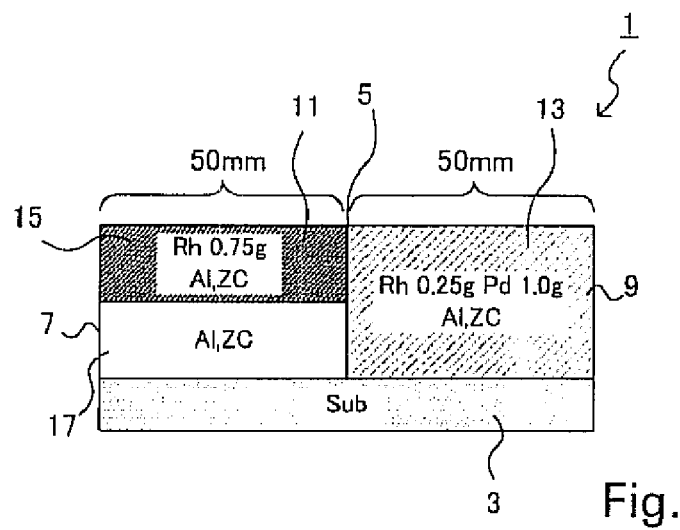
FIG. 15 is an explanatory diagram showing a structure of an exhaust gas purifying catalyst according to a comparative example 2.

An exhaust gas purifying catalyst 1 of a Comparative Example 2 has basically the same structure as that of the Comparative Example 1, as shown in FIG. 15. The Comparative Example 2 is different from the Comparative Example 1 in that the upstream portion outside layer 15 includes a Zr rich composite oxide instead of a Ce rich composite oxide.

A method of manufacturing the exhaust gas purifying catalyst 1 of the Comparative Example 2 is basically the same as in the Comparative Example 1. In the Comparative Example 2, 50.75 g of the slurry SIB (containing 0.75 g of Rh) was applied in place of the slurry SP1 in order to form the upstream portion outside layer 15.

Comparative Example 3

Figure 16:
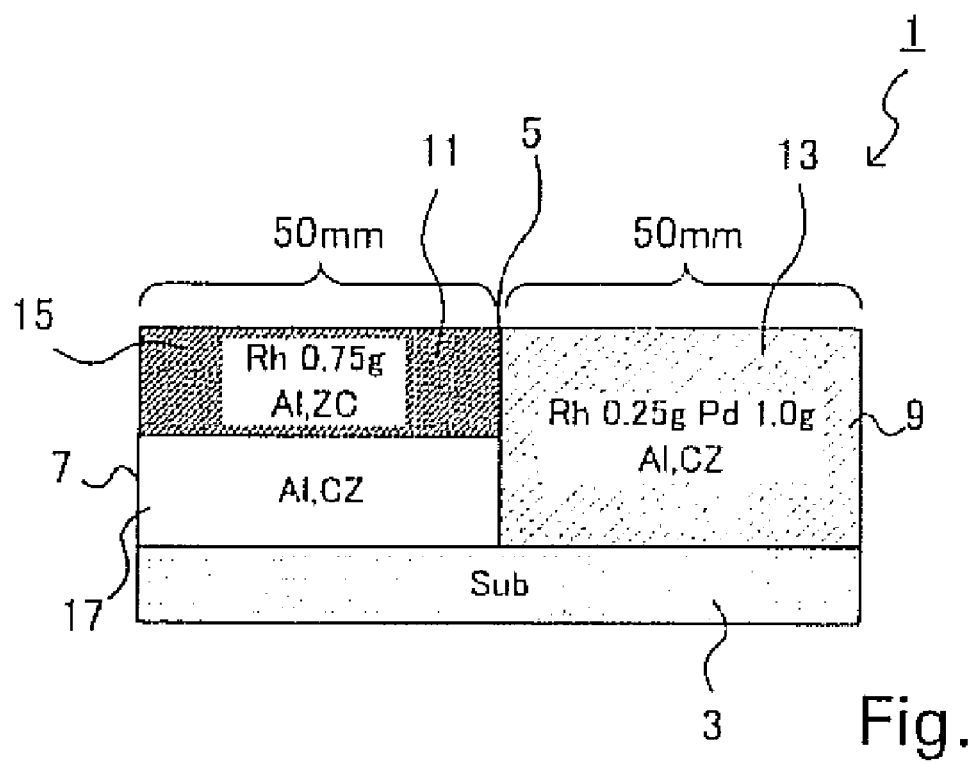
FIG. 16 is an explanatory diagram showing a structure of an exhaust gas purifying catalyst according to a comparative example 3.

An exhaust gas purifying catalyst 1 of a Comparative Example 3 has basically the same structure as that of the Comparative Example 1, as shown in FIG. 16. The Comparative Example 3 is different from the Comparative Example 1 in that the refractory inorganic oxide contained in the upstream portion inside layer 17 and the downstream portion 13 is a Ce rich composite oxide, and in that the refractory inorganic oxide contained in the upstream portion outside layer 15 is a Zr rich composite oxide.

A method of manufacturing the exhaust gas purifying catalyst 1 of the Comparative Example 3 is basically the same as in the Comparative Example 1, but is partially different. Specifically, 50 g of the slurry S1A was applied in place of the slurry S13 in order to form the upstream portion inside layer 17. Also, 50.75 g of the slurry S1B (containing 0.75 g of Rh) was applied in place of the slurry SP1 in order to form the upstream portion outside layer 15. Further, 101.25 g of a below specified slurry SP3 (containing 0.25 g of Rh and 1.0 g of Pd) was applied in place of the slurry S1C in order to form the downstream portion 13.
(Slurry SP3)
alumina: 50 g
Ce rich composite oxide (with a relative proportion of $CeO_2$ of 80 wt %): 50 g
Rh nitrate solution: an amount containing 0.25 g of Rh
Pd nitrate solution: an amount containing 1.0 g of Pd
water: 50 g Comparative Example 4

Figure 17:
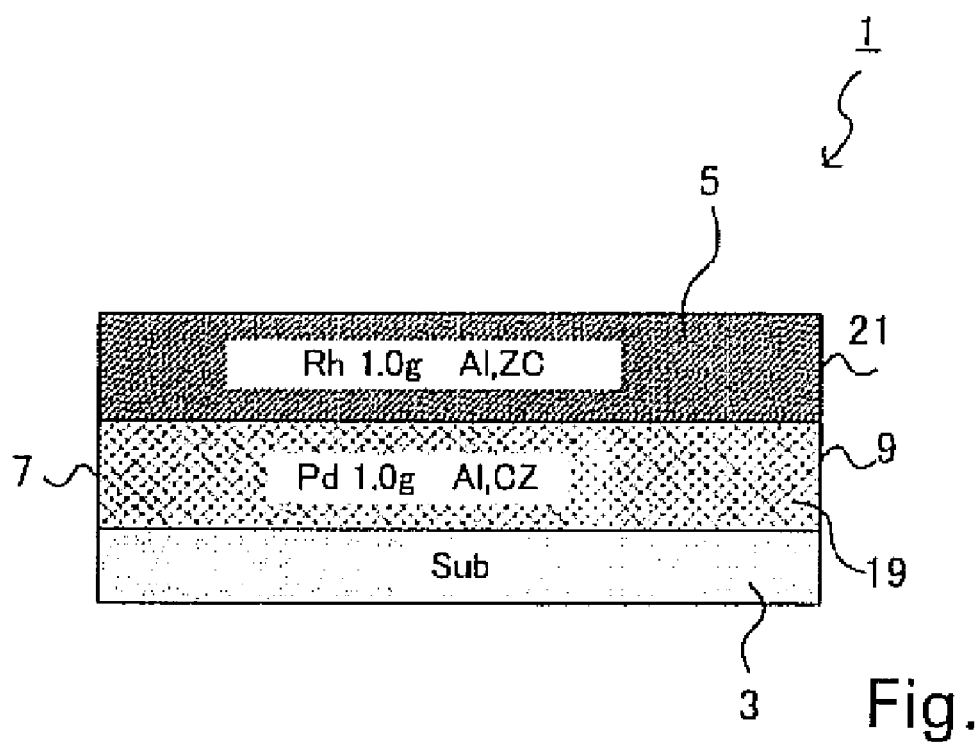
FIG. 17 is an explanatory diagram showing a structure of an exhaust gas purifying catalyst according to a comparative example 4.

A structure of an exhaust gas purifying catalyst 1 of a Comparative Example 4 includes a catalyst coating layer 5 formed on the cell surface of the same substrate 3 as in the Embodiment 1, as shown in FIG. 17. Unlike the Embodiments 1 through 13, the catalyst coating layer 5 is not divided into an upstream portion and a downstream portion. The catalyst coating layer 5 has a two-layer structure including an inside layer 19 and an outside layer 21. The inside layer 19 contains alumina, a Ce rich composite oxide and 1.0 g of Pd as the noble metal. The outside layer 21 contains alumina, a Zr rich composite oxide and 1.0 g of Rh as the noble metal.

The exhaust gas purifying catalyst 1 of the Comparative Example 4 may be manufactured as described below.

Firstly, 101.0 g of a slurry SP4A (containing 1.0 g of Pd) specified below was applied to coat the entire cell of the same substrate 3 as in the Embodiment 1, dried at 250° C. for an hour, and calcined at 500° C. for an hour, to thereby form the inside layer 19.

(Slurry SP4A)
alumina: 50 g
Ce rich composite oxide (with a relative proportion of $CeO_2$ of 80 wt %): 50 g
Pd nitrate solution: an amount containing 1.0 g of Pd
water: 100 g Then, 101.0 g of a slurry SP4B (containing 1.0 g of Rh) specified below was applied to coat an area previously coated with the slurry SPSA, dried at 250° C. for an hour, and calcined at 500° C. for an hour, to thereby form the outside layer 21.

(Slurry SP4B)
alumina: 50 g
Zr rich composite oxide (with a relative proportion of $ZrO_2$ of 80 wt %): 50 g
Rh nitrate solution: an amount containing 1.0 g of Rh
water: 100 g Ignition performance was tested regarding each of the Embodiments 1 through 13 and the Comparative Examples 1 through 4.

(Test Method)

After conducting a durability test corresponding to 80,000 Km run, each of the exhaust gas purifying catalysts according to the respective embodiments and comparative examples was mounted on an actual vehicle having an engine of 2.0 L displacement. HC, CO and NOx emissions were measured after conducting a running test according to the Japanese 11 mode test.

Table 1 shows the test results.

TABLE 1

| Sample | HC emission (g/test) | CO emission (g/test) | NOx emission (g/test) |
|---|---|---|---|
| Embodiment 1 | 0.44 | 1.41 | 0.32 |
| Embodiment 2 | 0.47 | 1.50 | 0.39 |
| Embodiment 3 | 0.50 | 1.55 | 0.40 |
| Embodiment 4 | 0.45 | 1.49 | 0.38 |
| Embodiment 5 | 0.47 | 1.53 | 0.40 |
| Embodiment 6 | 0.39 | 1.35 | 0.25 |
| Embodiment 7 | 0.49 | 1.38 | 0.30 |
| Embodiment 8 | 0.47 | 1.43 | 0.37 |
| Embodiment 9 | 0.39 | 1.35 | 0.28 |
| Embodiment 10 | 0.40 | 1.33 | 0.26 |
| Embodiment 11 | 0.40 | 1.33 | 0.29 |
| Embodiment 12 | 0.42 | 1.37 | 0.27 |
| Embodiment 13 | 0.37 | 1.30 | 0.27 |
| Comparative Example 1 | 0.66 | 1.87 | 0.63 |
| Comparative Example 2 | 0.58 | 1.65 | 0.57 |
| Comparative Example 3 | 0.70 | 1.99 | 0.66 |

TABLE 1-continued

| Sample | HC emission (g/test) | CO emission (g/test) | NOx emission (g/test) |
|---|---|---|---|
| Example 3 Comparative Example 4 | 0.70 | 2.00 | 0.66 |

As shown in Table 1, the HC, CO and NOx emissions of the exhaust gas purifying catalysts according to the Embodiments 1 through 13 are remarkably low as compared with those of the Comparative Examples 1 through 4. Specifically, the emissions of the exhaust gas purifying catalyst according to the Embodiment 10 are further low, since Pd is contained in the upstream portion inside layer 17. Also, the emissions of the exhaust gas purifying catalyst according to the Embodiment 11 are further low, since the coating amount per unit volume in the upstream portion 11 is smaller than that in the downstream portion 13. Also, the emissions of the exhaust gas purifying catalyst according to the Embodiment 13 are further low, since the noble metal is contained mainly in the surface region of the upstream portion outside layer 15 and the downstream portion 13.

From the above experiments, it was confirmed that the ignition performance of each of the exhaust gas purifying catalysts according to the Embodiments 1 through 13 is excellent.

It is to be understood that the present invention should not be limited to the above described embodiments, but may be practiced in various forms within the scope not departing from the present invention.

The invention claimed is:

1. An exhaust gas purifying catalyst comprising:
a catalyst substrate; and
a catalyst coating layer containing a noble metal and a refractory inorganic oxide, and formed on the catalyst substrate;
    wherein the catalyst coating layer includes an upstream portion located upstream and a downstream portion located downstream in a flow direction of the exhaust gas;
    the upstream portion has a layered structure including an upstream portion inside layer and an upstream portion outside layer; and
    the upstream portion inside layer contains a cerium-zirconium composite oxide in which a relative proportion of $CeO_2$ is 50 to 95 wt %, as the refractory inorganic oxide, and the upstream portion outside layer and the downstream portion contain a cerium-zirconium composite oxide in which a relative proportion of $ZrO_2$ is 50 to 95 wt %, as the refractory inorganic oxide.

2. The exhaust gas purifying catalyst according to claim 1, wherein the downstream portion has a layered structure including a downstream portion inside layer and a downstream portion outside layer, and the downstream portion inside layer and the downstream portion outside layer are different in at least one of:
    at least one of a type and a concentration of the noble metal; and
    a type of the refractory inorganic oxide.

3. The exhaust gas purifying catalyst according to claim 2, wherein the downstream portion outside layer contains Rh as the noble metal.

4. The exhaust gas purifying catalyst according to claim 1, wherein the upstream portion outside layer contains Rh as the noble metal.

5. The exhaust gas purifying catalyst according to claim 1, wherein the upstream portion inside layer contains Pd as the noble metal.

6. The exhaust gas purifying catalyst according to claim 1, wherein a coating amount per unit volume of the catalyst coating layer is smaller in the upstream portion than in the downstream portion.

7. The exhaust gas purifying catalyst according to claim 1, wherein the noble metal is contained mainly in an external region of the upstream portion outside layer.

* * * * *